United States Patent
Edwards (10) Patent No.: US 7,395,281 B2
(45) Date of Patent: Jul. 1, 2008

(54) FILE SYNCHRONISATION (75) Inventor: Nicholas H Edwards, Ipswich (GB)

(73) Assignee: British Telecommunications public limited company, London (GB)

(*) Notice: Subject to any disclaimer, the term of this patent is extended or adjusted under 35 U.S.C. 154(b) by 329 days.

(21) Appl. No.: 10/469,353

(22) PCT Filed: Mar. 27, 2002

(86) PCT No.: PCT/GB02/01450

§ 371 (c)(1),
(2), (4) Date: Aug. 28, 2003

(87) PCT Pub. No.: WO02/077862

PCT Pub. Date: Oct. 3, 2002

(65) Prior Publication Data

US 2004/0073560 A1 Apr. 15, 2004

(30) Foreign Application Priority Data

Mar. 27, 2001 (EP) .................................. 01302825

(51) Int. Cl.
G06F 12/00 (2006.01)

(52) U.S. Cl. ....................................................... 707/203
(58) Field of Classification Search ................. 707/203, 707/204; 709/200
See application file for complete search history.

(56) References Cited

U.S. PATENT DOCUMENTS

| 5,778,389 | A | | 7/1998 | Pruett et al. |
| 5,909,689 | A | | 6/1999 | Van Ryzin |
| 6,016,553 | A | * | 1/2000 | Schneider et al. ............. 714/21 |
| 6,061,686 | A | | 5/2000 | Gauvin et al. |
| 7,051,064 | B1 | * | 5/2006 | Yamagishi et al. .......... 709/200 |

OTHER PUBLICATIONS

Miller et al., CHI Letters, vol. 1, No. 1, pp. 65-66, 1999.*
Dempsey et al., Technical Report TR-1999-01, School of Information and Library Science, UNC Chapel Hill, Apr. 30, 1999, pp. 1-21.*
Balasubramaniam et al, "What is a File Synchronizer?", MOBICOM '98 Proceedings of the 4th Annual ACM/IEEE International Conference on Mobile Computing and Networking. Dallas, TX, Oct. 25-30, 1998, Annual ACM/IEEE International Conference on Mobile Computing and Networking, New Yhork, NY:ACM, US, pp. 98-108, XP000850260.

* cited by examiner

Primary Examiner—Cheyne D Ly
(74) Attorney, Agent, or Firm—Nixon & Vanderhye P.C.

(57) ABSTRACT

In order to allow files structures at different locations to be synchronized, a folder tree descriptive of each set of folders is created and stored at a plurality of locations. On subsequent interconnection of the two locations a new tree is created for each location and the earliest of the old trees is used to determine which files, folders or paths of the two locations have been amended. This enables deletion or re-synchronization of files between the two locations even though files may have been worked on at different locations and at different times.

3 Claims, 7 Drawing Sheets

FILE SYNCHRONISATION

This application is the US national phase of international application PCT/GB02/01450 filed 27 Mar. 2002 which designated the U.S.

BACKGROUND

1. Technical Field

This invention relates to file synchronisation and more particularly to a method of synchronising files and folders held in a plurality of locations.

2. Related Art

Users of data files often need to be able to work with the files in more than one location. While files may be remotely accessed and operated upon it is not always possible to effect a suitable network connection to a data warehouse or file server on which working files may be stored. Accordingly, a typical user may have portable computer apparatus in which copies of files with which the user works are held and a similar set of files are held in a network accessible location or in a desktop computer. While it is possible to synchronise files worked upon in a single location by copying across all of the files from the portable computer, for example, to a file server or vice versa, this may not be effective where multiple locations are involved. Other synchronisation programs having a limited functionality restricted to two locations require significant manual intervention from a user if more than one set of files has been altered. In general computer file systems, for example, the Window™ FAT (file allocation table) store very limited date and time information in relation to a file. Thus, windows FAT stores data defining date and time on which a file is modified, accessed or created, the FAT system does not recognise a file which is renamed or moved.

In a conference paper from Mobicom 98, Proceedings of the 4th Annual ACM/IEE international conference on Mobile Computing and Networking, Dallas Tex., Oct. 25-30, 1998, pages 98-108 there is disclosed a file synchronizer which purports to maintain a plurality of file stores in step. However, in common with many such synchronizers, the synchronization is by master-slave relationship. Accordingly in a conflict between data files in the master/slave relationship either the master will always prevail or manual intervention will be required. The system disclosed is also not suitable for maintaining more than two file stores in synchronization since any update in one file store results in a new "master" store having conflicting information for a third file store.

U.S. Pat. No. 5,909,689 (Ryzin) uses two lists and comparison of temporal information for the purposes of isolating conflicts but refers such conflicts to user for resolution. U.S. Pat. No. 6,061,686 (Gauvin et al) discloses a synchronizer for web pages but operates by assuming that the server on the World Wide Web is always more up to date than the cache therefore updating in a pure master/slave relationship.

BRIEF SUMMARY

According to an exemplary embodiment of the present invention there is provided a method of synchronizing data held in a respective plurality of files in each of a plurality of data stores comprising: determining a file structure of a first of said data stores to create a first new tree; determining a file structure of a second of said data stores to create a second new tree; comparing a previously created first tree (if any) held in said first data store with a previously created second tree (if any) held in said second of said data stores to determine which was earliest created; and comparing the earliest created of said trees with each of said first new tree and said second new tree to determine which files or folders are differentiated from a previous synchronization between the two data stores; causing differentiated files or folders to be updated in either the first or the second data store either by deleting files from one store or copying a later file version or new file from one of said stores to the other of said stores in dependence upon the comparison result and storing the first and second new trees in their respective data stores for subsequent synchronizations.

The method may be used to synchronise data stores at a plurality of locations without a network interconnection by storing the first new tree together with the files on a transportable medium, transporting said medium to a second location and effecting comparison between the first new tree and the second previously created tree, whereby data files held at said second location are synchronised at said first location.

In a further enhancement the second new tree may be stored on the transportable medium together with the second data store, whereby the transportable medium can be used to effect re-synchronisation of files which have been modified at said second location at said first location.

BRIEF DESCRIPTION OF THE DRAWINGS

A synchronisation method will now be described by way of example only with reference to the accompanying drawings of which.

DETAILED DESCRIPTION OF EXEMPLARY EMBODIMENTS

The method of the invention provides an efficient way of synchronising copies of files held in two or more locations. In the embodiment now to be described it will be seen that the user can re-synchronise files after some or all of the files have been updated in any of the two or more locations. In particular, the invention allows for synchronisation with a minimum amount of network traffic between locations since the file comparison and synchronisation only results in incremental changes being recorded between the two locations.

Continuous monitoring of file structures to detect changes is not necessary when the present invention is used and the capability to synchronise files in more than two locations provides additional possibilities for ways of managing data. Additionally, when data stores on two computers are being synchronised, the synchroniser software is required to run on only one PC to achieve synchronisation.

Typical examples of transfer where a user may require files stored in accessibly more than one location include, for example, having a laptop computer and a desktop computer or two desktop computers at different locations, for example, a home computer and one in an office. It is also necessary to maintain computer backups so that a working copy can be synchronized to a back up from time to time. Users of the Internet may wish to maintain an listing of favorite URLs, for example, on more than one computer and where a service provider or website owner has a published website it is possible to update the published website to reflect information held in a development website, for example.

Only a small fraction of files may be updated, deleted or new files created at one of the locations leading to inefficiencies in copying and network usage where the synchronisation is effected across a network. Thus the synchroniser reduces the amount of network traffic because only materials which have been updated are changed, therefore reducing both the time and cost of effecting an update.

Figure 1A:
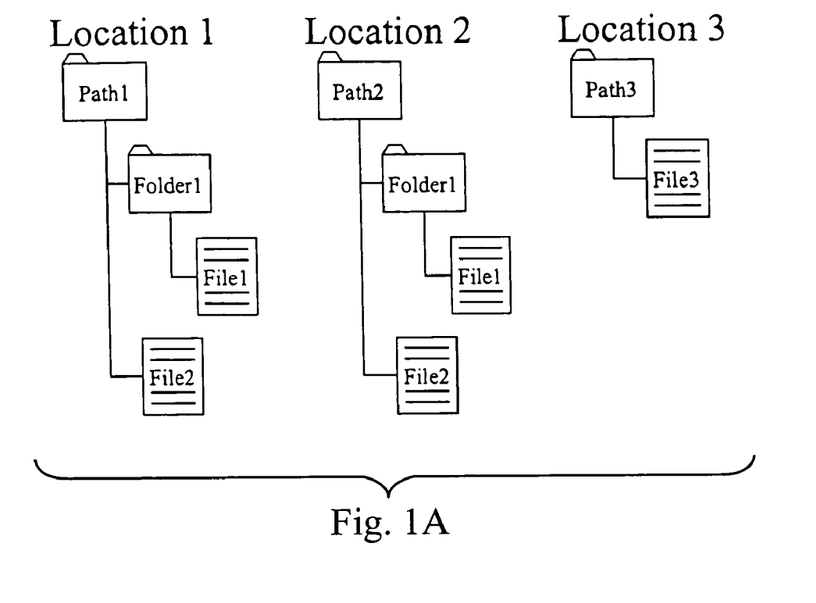
FIG. 1A-B are schematic diagram of files held in a plurality of data stores.
Figure 1B:
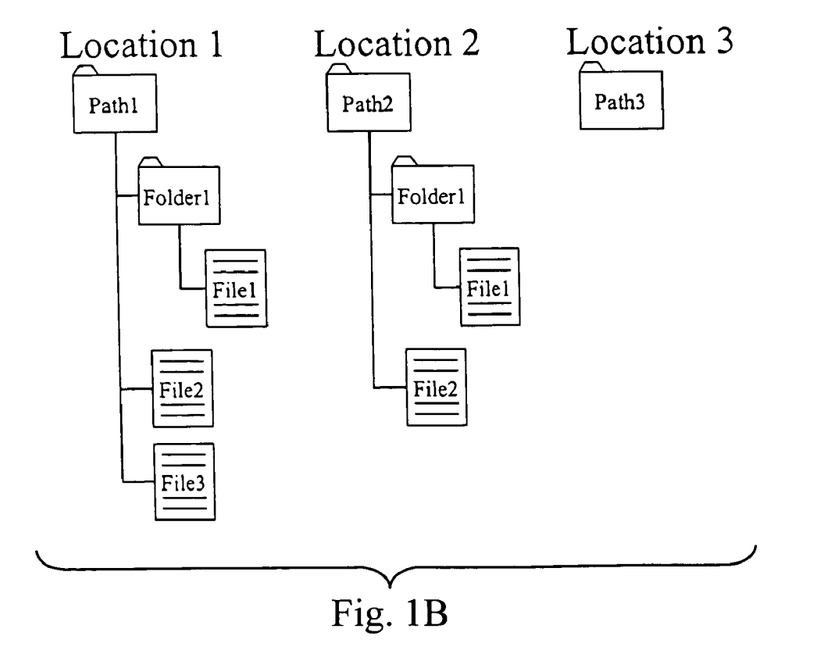

Referring now to FIG. 1, in FIG. 1a typical hierarchical directory trees for locations 1 and 2 are shown as being identical having a path comprising folder, including file1, and a file2 directly linked to path1. For convenience file3 is shown at path3 of a separate location.

If the user, now at location 1, say at a home computer, downloads file3 from the third location and stores it in path1, locations 1 and 2 are out of synchronisation. In a comparison of the file trees of locations 1 and 2 subsequently, even although it is known that each location previously contained the same content file3 will be present in the location 1 file structure but not in that of location 2.

However, the file structure does not permit the system to determine normally whether the file has been moved or renamed in location 1 or whether the file was originally present in both locations and has been deleted from location 2. Such an ambiguous situation may previously have required a user to intervene.

Figure 2:
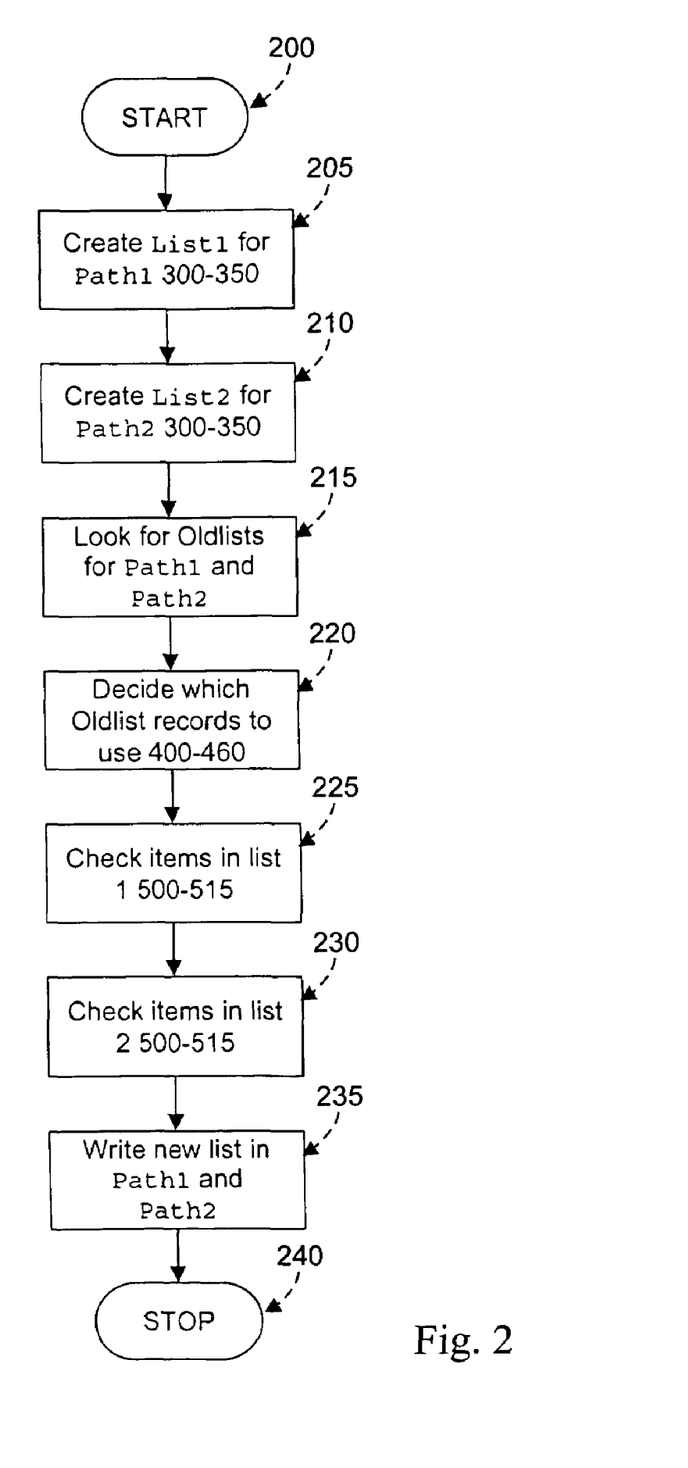
FIG. 2 is a flow chart showing an outline of the exemplary synchronization method.

Referring additionally to FIG. 2, the synchronisation process shown creates a listing for path1 reflecting the tree of location 1 at step 205. At step 210 a similar listing is created for location 2. Each of these lists is created using the macro function of FIG. 3, hereinafter described. The program now searches at step 215 for previous lists in respect of path1 and path 2 and uses a macro function (FIG. 4) to determine which of the old list records for path1 or path 2 is to be used as the controlling list.

Figure 5:
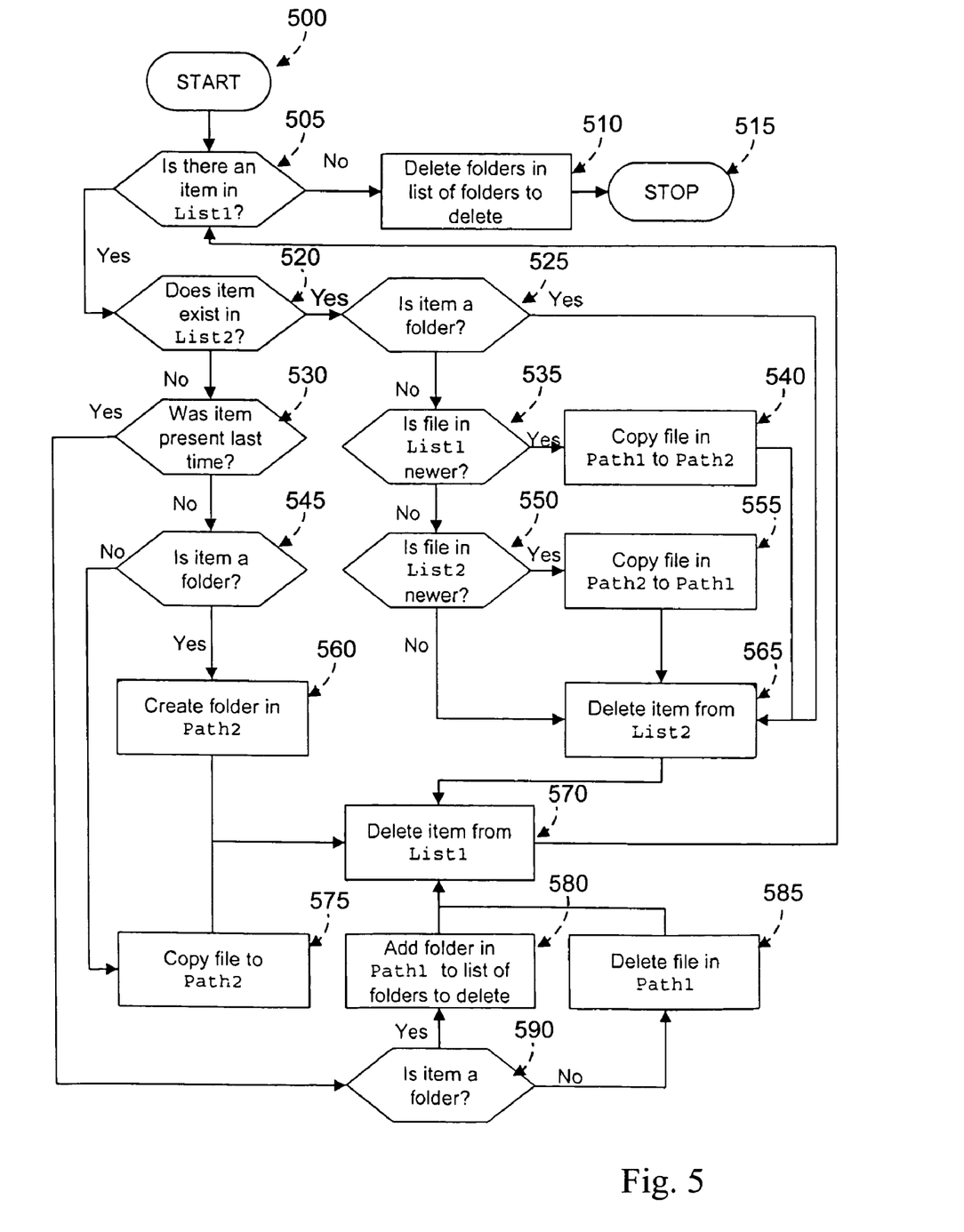

At step 225 using the macro function of FIG. 5, each item in list1 (created for the current path1) is compared with the old list and files in path 1 are updated as appropriate. A similar function may now be carried out in respect of list2 at step 230 so that both path1 and path2 will contain identical sets of files as a result of the synchronization. The listing of these files is now stored in path1 and path 2 at step 235, so that the next time either path is synchronized the stored listing will be read as the old list at step 215. Thus the synchronization of folders is simply completed and the process stops at step 240.

Figure 3:
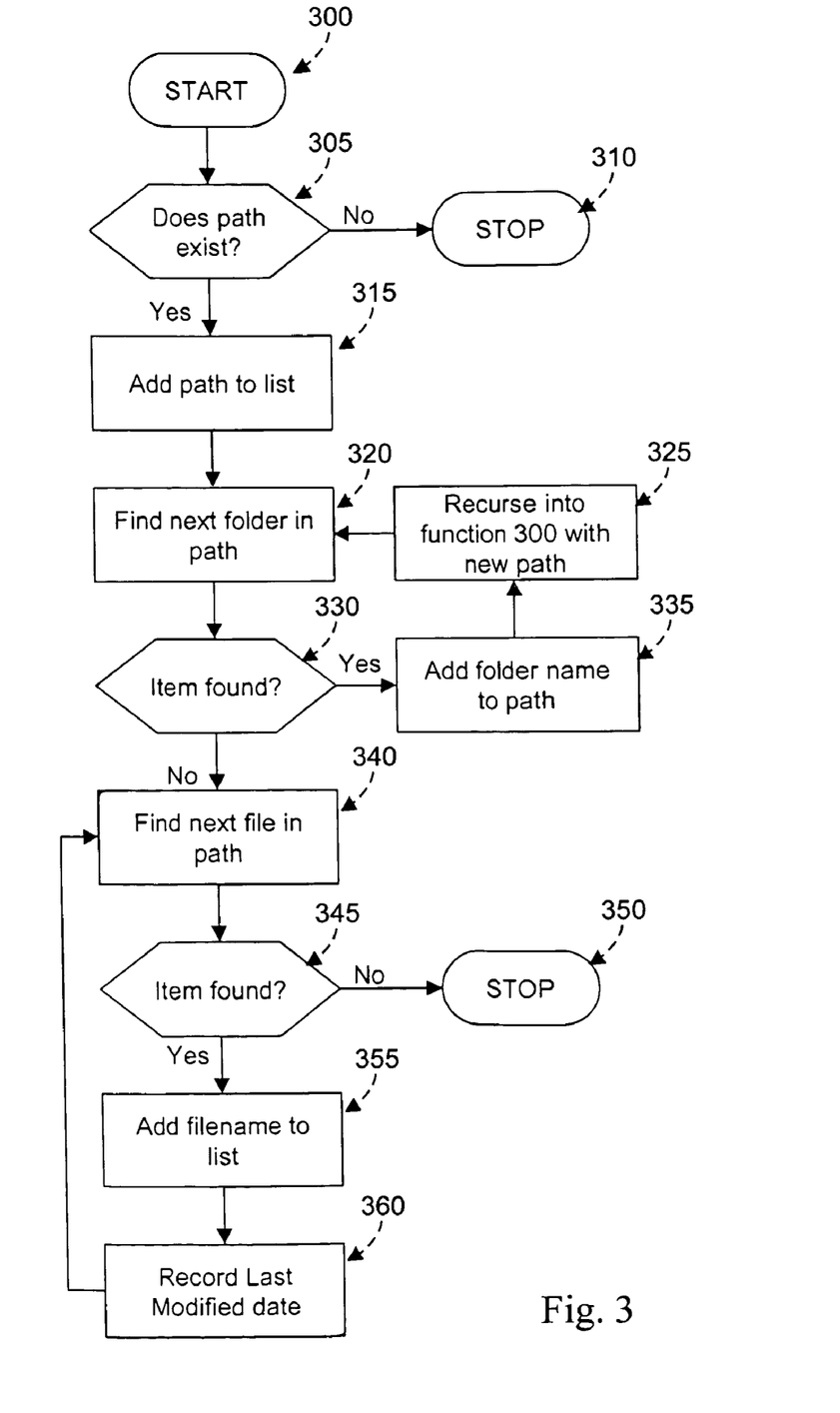
FIGS. 3 to 6 are show charts showing details of algorithms and macro functions of FIG. 2.

Turning now to FIG. 3, the list creation function of step 205 and 210 of FIG. 2 is shown in further detail. Initially, clearly if there are no files held in one of the locations, this can be determined at step 305 and the creation of the first list ceases. This will occur on the first synchronisation of a new data store for example.

Assuming that the path does exist at step 305, then the path is added to the list at step 315 and at step 320 folders in the path are considered in turn and for each folder, the flow chart is re-entered at step 300 with the new path detail using recursive function. Once all of the folders in the path have been analyzed, the files which are present directly in the path, for example file2 of FIG. 1a, will be determine. Thus at step 340, 345 and 355 each of the files are located and the last modification date of the file stored. Once all paths, folders and files have been located then the macro function returns to the next step of FIG. 2. Accordingly the list is ordered so that folders are listed before their contents, for example for the file structure of location 1 of FIG. 1 a the file listing would read:

c:\path1
c:\path1\folder1
c:\path1\folder1\file1
c:\path1\file2

Having created lists for each of the locations, and turning now to FIG. 4, the record of previous synchronisation to be used is determined as follows. After starting the function 400 a determination is made to see whether old list1 (the tree created in respect of path1 at the previous synchronisation) exists at step 405. If old list1 does not exist then a similar check is carried out for the tree created in respect of location 2 and if old list2 exists then no list is used for path1 and old list2 is used for path 2 step 415 determining. If neither list exists at step 425, then a no list instruction for path1 and path 2 is determined so that file synchronisation is occurring for the first time. If old list1 exists, as indicated at step 405, a determination of the existence of old list2 at step 420 is carried out and if this list does not exist then an empty list is returned for path 2 and old list1 for path1. If both old list1 and old list2 are in existence, as indicated at step 430, a comparison is made between the dates of the two lists. If the first created of the old lists was old list2, then that list is determined as the list to be used for both paths in subsequent comparisons. This is shown as step 440. If old list2 is not older than list1 then the determination is made is to whether list1 is earlier in date that list2 and if so old list1 is used for both paths 1 and 2 as indicated at step 455. If the synchronisation dates of old list1 and old list2 are identical then a determination is made as to the speed at which the old lists will be loaded in dependence upon their location. Thus if old list1 is held on a hard disk and old list2 on a floppy disk for example, old list1 will be expected to load faster. Thus at step 445,the faster loading of the two files will be determined as the indication of the list to be used for each of paths 1 and 2 will return through steps 450 or 455 as appropriate.

Figure 4:
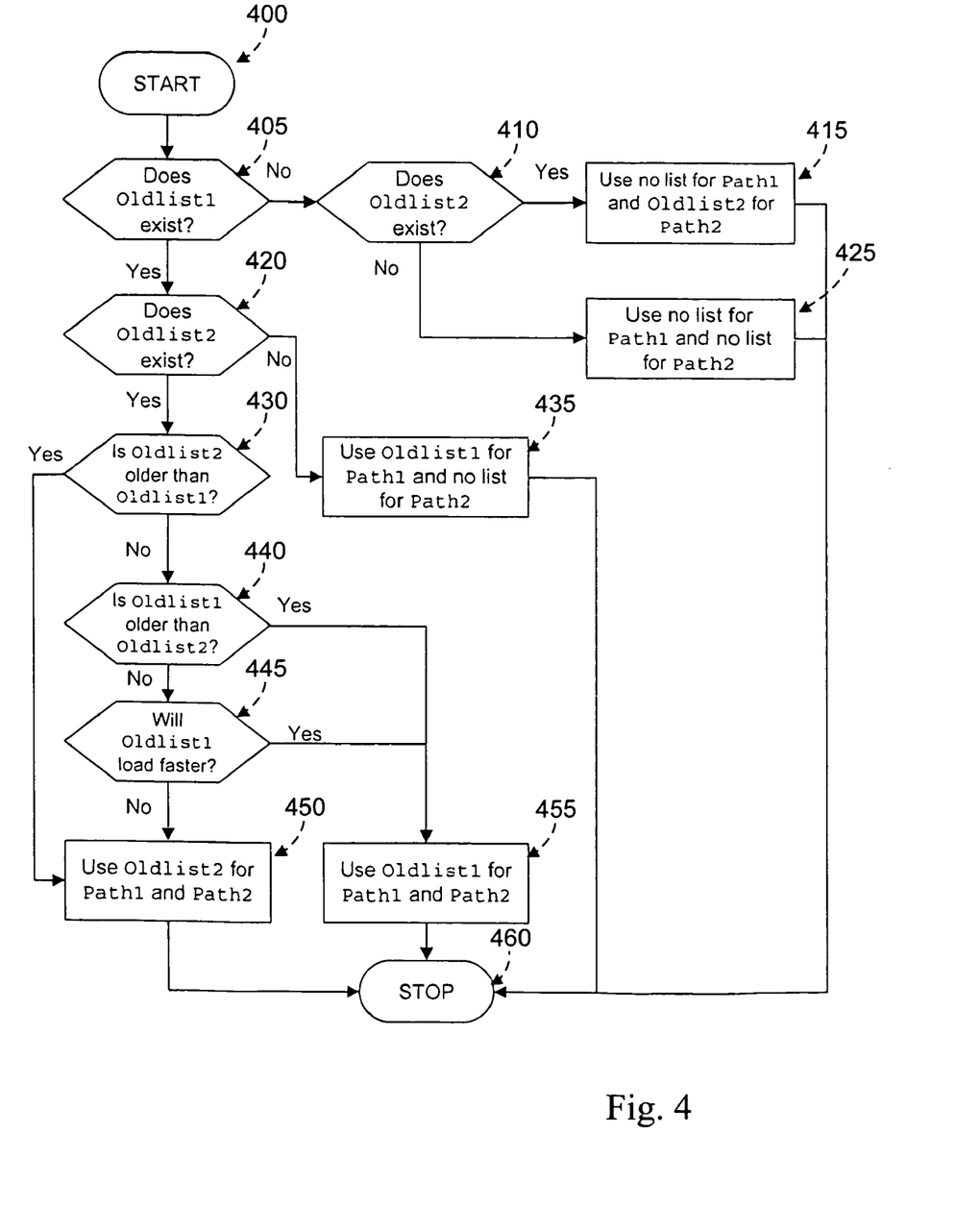

Referring now briefly back to FIG. 2, having determined at step 220, using the macro function of FIG. 4 which old list record to use, the items in the listings created at steps 205 and 210 are now compared, firstly using the macro of FIG. 5 the items in list1 are checked against the old list (or no list as appropriate) determined previously.

Figure 6:
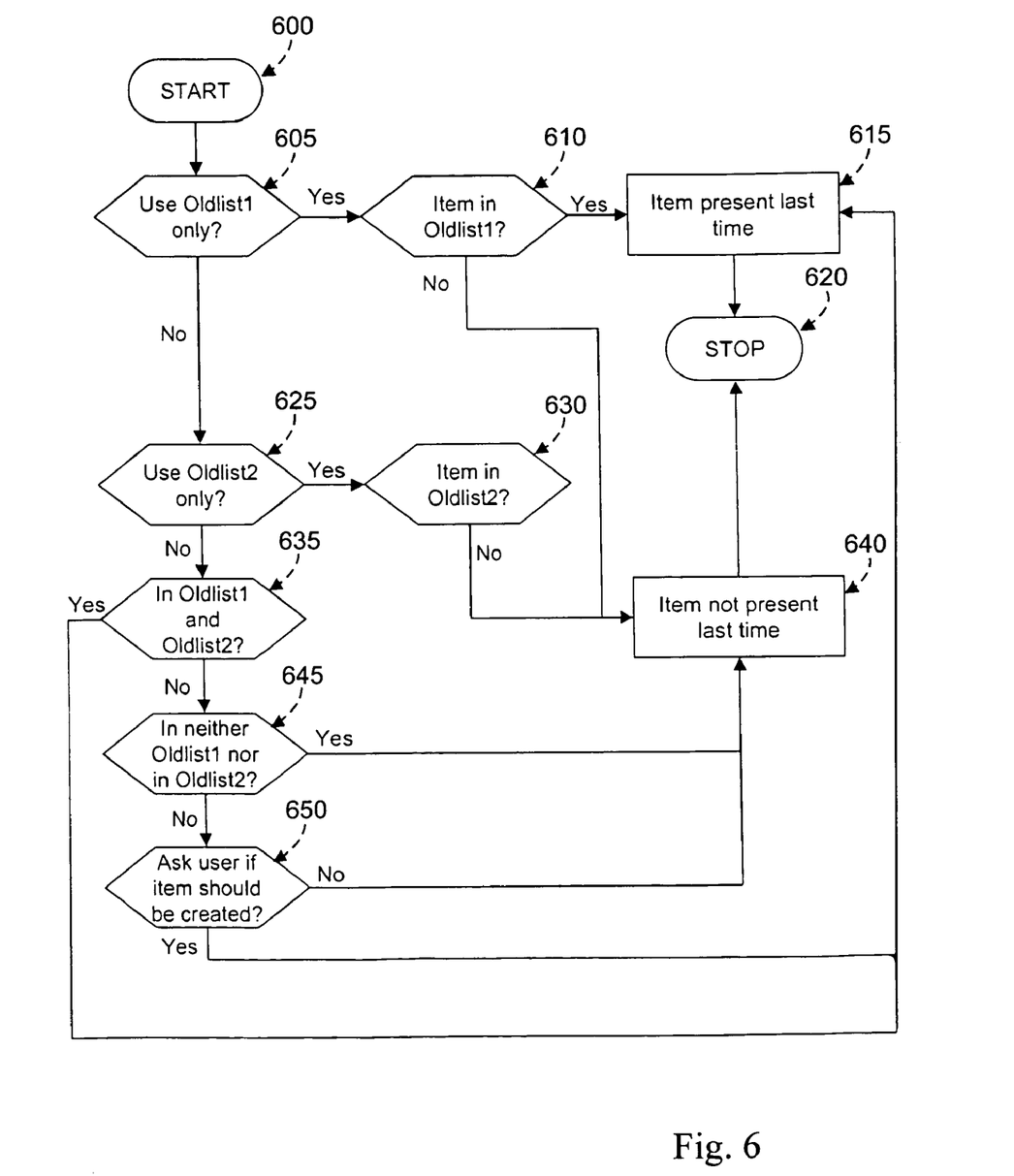

Referring to FIG. 5, the Synchronizer looks for an item at the top of List1, at step 505. If no item is present then any folders in the list of folders to delete are deleted in reverse order to that in which they were added to the list, step 510, and this stage is complete at step 515. Otherwise, the Synchronizer checks if the item exists in List2, step 520. If the item is not present in List2, then it has either been moved to or created in Path1 more recently than the last synchronization, or has been moved or deleted from Path2 more recently than the last synchronization. The information as to which of these two possibilities is correct cannot be derived from the file or folder date, as the item may have been created elsewhere and copied or moved to that location. Therefore, the synchronizer checks for previous records of the item, step 530. This process is shown in FIG. 6 and described in detail below. If the item was present before, then it must have been deleted from Path2 and therefore the appropriate action is to remove the item from Path1. The Synchronizer checks if the item is a folder 590. If it is a folder then it is added to a list of folders to be deleted 580. Otherwise, the item is a file, and is deleted 585. The item is then deleted from List1 570. If the item was not present before, then the Synchronizer checks whether the item is a file or a folder 545. If it is a folder then the folder is created in Path2 560 and the item deleted from List1 570. The Synchronizer then checks List1 for any further items 505. If the item is a file, then the file is copied to Path2 575, and the item deleted from List1 570.

If the item is present in List2, then the item is present in both locations. The Synchroniser checks if the item is a folder 525. If it is a folder then the item is deleted from List2 565 and List1 570. If it is a file, then the Synchroniser checks if the file in List1 is newer than that in List2 535. If it is newer then the file in Path1 should be copied to Path2 540. If the file in List2 is newer than that in List1 550 then the file in Path2 should be copied to Path1 555. If the files are the same age then no files are copied. The entries are then deleted in List2 565 and List1 570.

Once the item has been deleted from List1 570, then the List1 is checked for any further items 505.

Referring to FIG. 6, the Synchroniser determines whether the item was present at the previous synchronisation as follows. If Oldlist1 is being used as the record of previous files 605, then if the item is in Oldlist1 610 then the item must have been present at the previous synchronisation 615. Conversely, if the item is not in Oldlist1 then the Item was not present at the previous synchronisation 640.

Similar logic is applied when only Oldlist2 is being used 625. If the item is in Oldlist2 630 then the item must have been present at the previous synchronisation 615. Conversely, if the item is not in Oldlist2 then the Item was not present at the previous synchronisation 640. Otherwise both Oldlist1 and Oldlist2 must be checked. If the item is present in both Oldlist1 and Oldlist2 635 then it is deemed to be have been present, and likewise if it is absent in both Oldlist1 and Oldlist2 645 then it is deemed not to have been present. If it is present in only one of the lists 650, then the user must be prompted to resolve the issue.

Figure 7:
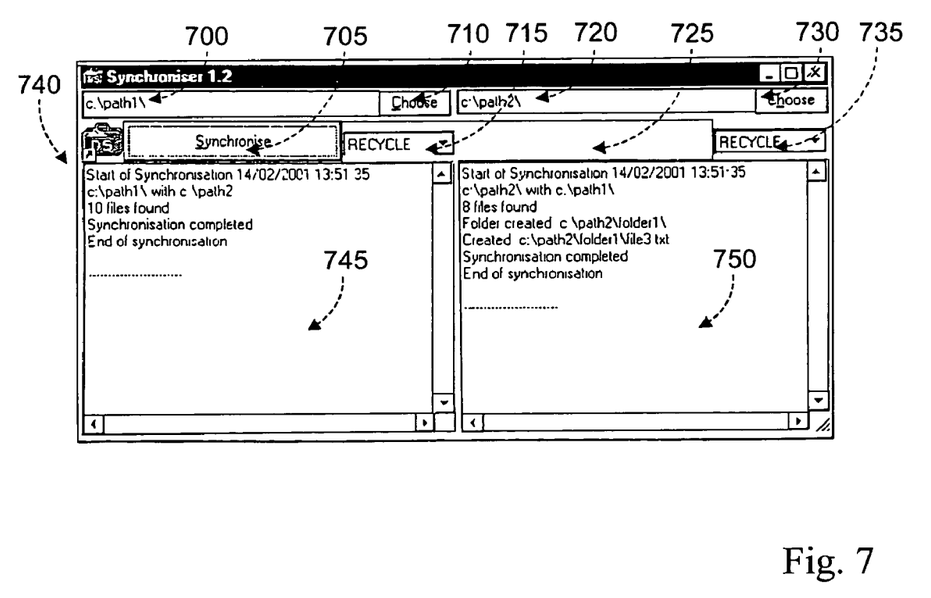
FIG. 7 shows a typical screen output during synchronisation.

FIG. 7 is a screen shot of an implementation of the synchroniser. The screen is divided by a vertical separator into two sections, which relate to the two paths. Edit boxes 700 and 720 allow the user to enter the paths which are to be synchronised. Alternatively, the user may use a browsing function accessible through buttons 710 and 735 to select the paths. The user may select options for protection using the choice boxes 715 and 735. This feature is discussed below.

Once the paths and options for the synchronisation are selected, then the user may synchronise the paths with the Synchronise button 705. During synchronisation, the synchronise button changes function to 'Abort' to allow the user to stop the synchronisation process at any stage. Progress (fraction of the synchronisation complete) is shown in a status panel 725, and details of the modifications made to each path are itemised in text boxes 745 and 750. A shortcut button 740 allows a user to create a shortcut which will enable the user to resynchronise the same two paths at a later date simply by activating the shortcut. This means that the paths and options are all automatically set by the shortcut.

The Synchroniser can have a number of embellishments which provide additional features to a user. Many of these centre around the capabilities of the Synchroniser of deleting a user's files. Features which are provided in the example implementation include:

'Recycling' of Files

The synchroniser can be set to 'Recycle' rather than delete files. This means that whenever the Synchroniser is to over-write or delete a file, the file is passed to the operating system to be 'recycled'. This means it is not deleted immediately, but stored in an area where it can be retrieved if required. 'Recycling' files is significantly slower than deleting them, so this feature is made optional.

'Undoable' Synchronisation

The Synchroniser can be set to create an 'Undo' file in each of the paths which if selected, will restore the paths to their original state. This means that copies of any deleted or over-written files must be stored for this purpose.

'Monitor' Synchronisation

The Synchroniser can be set to monitor, where it will not make any changes to a file structure, but will analyse the files and itemise the operations which it would carry out if it did Synchronise the two paths.

Levels of Privilege

The low-level operations carried out by the Synchroniser can be categorised, for example:
1. Create a new directory
2. Create a new folder tree
3. Copy files
4. Synchronise different records
5. Over-write updated files
6. Delete files The Synchroniser can be set so that the user can select whether they would like to be prompted before a given low-level operation is executed. The user then receives a dialogue such as:

"The file c:\Path1\File3 is about to be deleted. Press OK to delete and continue, No to leave present and continue, Cancel to abort synchronisation and All to delete for file updated since last synchronisation without further prompts". When the user is prompted, they may select that subsequent operations of the same type should be carried out without additional prompting.

What is claimed is:

1. A method of synchronizing data held in a respective plurality of files in each of a plurality of data stores where file structures of at least first and second of said data stores have been used to previously create first and second hierarchical directory trees, wherein the first and second hierarchical directory trees are respectively represented by a file path listing comprising one or more files with their respective file modification dates; said method comprising:
   determining a file structure of said first data store to create a first new hierarchical directory tree, wherein the first new hierarchical directory tree is represented by a file path listing comprising one or more files with their respective modification dates;
   determining a file structure of said second data store to create a second new hierarchical directory tree, wherein the second new hierarchical directory tree is represented by a file path listing comprising one or more files with their respective modification dates;
   comparing the modification date of a previously created first hierarchical directory tree held in said first data store with the modification date a previously created second hierarchical directory tree held in said second data store to determine which was earliest created; and
   comparing the modification date of the earliest created of said previously created hierarchical directory trees with the modification date each of said first new hierarchical directory tree and said second new hierarchical directory tree to determine which files are differentiated from a previous synchronization between the two data stores;
   updating differentiated files in either the first or the second data store either by deleting files from one store or copying a later file version or new file from one of said stores to the other of said stores in dependence upon the comparison result and storing the first and second new hierarchical directory trees in their respective data stores for subsequent synchronizations.

2. A method of synchronizing data as in claim 1, further comprising:
   storing the first new hierarchical directory tree together with differentiated files on a transportable medium, transporting said medium to a second location and effecting comparison between the first new hierarchical directory tree and the previously created second hierarchical directory tree,
whereby data files held at said second location are synchronized at said first location.

3. A method of synchronizing data as in claim 2, further comprising:

storing the second new hierarchical directory tree on the transportable medium together with differentiated files from said second data store,
whereby the transportable medium can be used to effect re-synchronization of files, which have been modified at said second location, at said first location.

* * * * *